United States Patent
Robinson et al.

(10) Patent No.: US 6,260,972 B1
(45) Date of Patent: Jul. 17, 2001

(54) LIQUID CRYSTAL PROJECTORS

(75) Inventors: Michael Geraint Robinson, Boulder, CO (US); Duncan James Anderson, Oxfordshire; Jason Kempton Slack, Oxford, both of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/369,362

(22) Filed: Aug. 6, 1999

(30) Foreign Application Priority Data

Aug. 11, 1998 (GB) .................................................. 9817328

(51) Int. Cl.[7] .................................................. G03B 21/14
(52) U.S. Cl. .................................................. 353/38; 353/20
(58) Field of Search .................. 353/38, 20; 349/7, 349/8, 9; 359/501, 494, 495, 496, 497

(56) References Cited

U.S. PATENT DOCUMENTS

| 5,418,583 | * | 5/1995 | Masumoto | 353/38 |
| 5,662,401 | * | 9/1997 | Shimizu et al. | 353/38 |
| 6,000,802 | * | 12/1999 | Hashizume et al. | 353/38 |
| 6,024,451 | * | 2/2000 | DeVaan et al. | 353/20 |
| 6,062,695 | * | 5/2000 | Kakuda et al. | 353/38 |
| 6,084,714 | * | 7/2000 | Ushiyama et al. | 359/627 |

FOREIGN PATENT DOCUMENTS 0812115   12/1997   (EP) .

\* cited by examiner

*Primary Examiner*—William Dowling
(74) *Attorney, Agent, or Firm*—Renner, Otto, Boisselle & Sklar

(57) ABSTRACT

A liquid crystal projector comprises a light source (4), a first lenslet array (6) comprising a plurality of first lenslets (10), a second lenslet array (14) comprising a plurality of second lenslets (12) and being con-focal with said first lenslet array (6), and at least one liquid crystal panel (26, 30, 36), wherein said first and second lenslet arrays (6, 14) are non-identical.

18 Claims, 9 Drawing Sheets

Contour map of flux at panel

Vertical intensity profile

LIQUID CRYSTAL PROJECTORS

The invention relates to liquid crystal projectors, and particularly although not exclusively to liquid crystal projectors suitable for projecting a colour television or video image onto a wall or screen.

Some prior art documents relating to this field will first be mentioned.

The paper entitled *Ultra-High-Efficiency LC Projector Using Light Illuminating System*, by Y. Itoh, J. -I. Nakamura, K. Yoneo, H. Kamakura, and N. Okamoto of Seiko Epson Corp., published in SID 97 Digest pages 993–996 describes the most efficient illumination system (see FIGS. 1 and 2) currently known for commercially available liquid crystal (LC) projectors. This system comprises two arrays of lenses, which will be referred to as lenslet arrays hereinafter. The paper discloses a homogeniser element (two lenslet arrays) that incorporates a method for substantially converting the unpolarised light from an arc lamp into one linear polarisation state. A disadvantage of this element is that it increases the extent of the light beam which translates into a loss in optical brightness of the final projected image. The present invention utilises a similar homogeniser element that minimises the increase in beam extent, which enables a higher thoughput system to be created.

U.S. Pat. No. 3,296,923 and U.S. Pat. No. 4,497,015 relate to conventional optical integrators and are based upon a first and second two-dimensional lens array, both lens arrays being arranged in a similar rectangular grid. In these two patents homogeniser elements increase the optical beam extent, and do not provide a method for converting the polarisation into mainly linearly polarised light. Since the homogeniser does not polarise the light and also increases the beam extent, a liquid crystal projector incorporating such a component is relatively inefficient.

U.S. Pat. No. 5,662,401 relates to source extent modification in cylindrically symmetrical systems to improve light throughput. U.S. Pat. No. 5,418,583 describes a non-identical set of two lenslet arrays used in conjunction with an arc light source and a parabolic reflector to utilise the optical extent of the output beam effectively. The light from the first lenslet array is focussed into (i) a rectangular distribution, or (ii) a circle with the smallest possible diameter; the aim being to minimise the 'dead space' in the optical distribution and hence extent. However, this arrangement does not incorporate a polarisation conversion scheme.

British Patent Application No. 9718741.3 and British Patent Application No. 9800018.5 relate to the concept of extent modification and homogenising lenslet arrays.

U.S. Pat. Nos. 5,662,401 and 5,418,583 and British Patent Application Nos. 9718741.3 and 98999 all describe optical homogeniser elements that minimise the increase in optical extent. However they do not incorporate polarisation conversion technology as outlined in the paper above (Y. Itoh et al).

According to the invention there is provided a liquid crystal projector comprising a light source, a first lenslet array comprising a plurality of first lenslets, a second lenslet array comprising a plurality of second lenslets and being con-focal with said first lenslet array, and at least one liquid crystal panel, wherein at least some of said first lenslets are non-identical with each other, and further comprising a polarising array comprising a plurality of polarising elements each arranged to polarise light passing through a respective second lenslet.

In one embodiment of the invention said first lenslet array produces an array of source images in a plane, and the area over which said array of source images extends is smaller than it would be if the first lenslets were identical with each other.

This is advantageous because by filling the gaps in the intensity distribution at the image plane of the first lenslet array, the extent of illumination is reduced allowing greater throughput of light in systems limited by the extent of source size. Such an arrangement can also be used with current technology and state of the art system designs, and need not add any further cost. The optical extent of the light source is used more efficiently offering the following advantages:

(i) a larger source may be used, with a concomitant increase in optical power;

(ii) a brighter projected image is obtained for systems that are "etendue limited" using a convention homogenisers and polarisation conversion elements;

(iii) slower projection lenses can be used, providing a cost saving; and (iv) smaller light valve panels can be used which translates into a smaller overall optical system.

The word "extent" defines the size of the optical beam in the system and is mathematically represented as the product of the beam size multiplied by the solid angle (divergence) of the beam. The extent of a projection system is limited by the size of the light valve and the f-number of the projection lens; if the extent of the projection system is smaller than that of the illuminating beam then the system is "etendue" limited and hence some light will be lost.

In a further embodiment of the invention said first lenslets are arranged in a number of lines, said first lenslet array produces a plurality of images of said source arranged in stripes, and at least some of said stripes contain source images from more than one of said lines so that the number of said stripes is less than the number of said lines.

In a further embodiment of the invention each first lenslet is paired with a corresponding second lenslet to form a pair of lenslets, and the spatial arrangement of first lenslets within said first lenslet array is different from the spatial arrangement of second lenslets within said second array.

In a further embodiment of the invention, for each pair of lenslets the physical centre of the first lenslet is the optic axis of the second lenslet, and the physical centre of the second lenslet is the optic axis of the first lenslet.

Each first lenslet may be rectangular in shape, as may each second lenslet.

Each second lenslet may be slightly larger than an image of said source produced at the second lenslet by a corresponding first lenslet.

Some light may be lost as a result of overfilling of at least some of said second lenslets.

Said plurality of polarising elements may be an array of polarising beam splitter elements located behind said second lenslet array.

An aperture array may be located in front of said array of polarising beam splitter elements.

Said aperture array may comprise a plurality of elongate apertures arranged parallel to each other.

The liquid crystal projector may further comprise three separate liquid crystal panels for modulating red, green and blue light respectively.

The liquid crystal projector may further comprise a projection lens arranged to project a television image onto a wall or screen.

The overall shapes of the first and second lenslet arrays may be different, for example the shapes may be generally square and generally rectangular respectively.

The invention will now be more particularly described, by way of example only, with reference to the accompanying drawings, in which.

Figure 1:
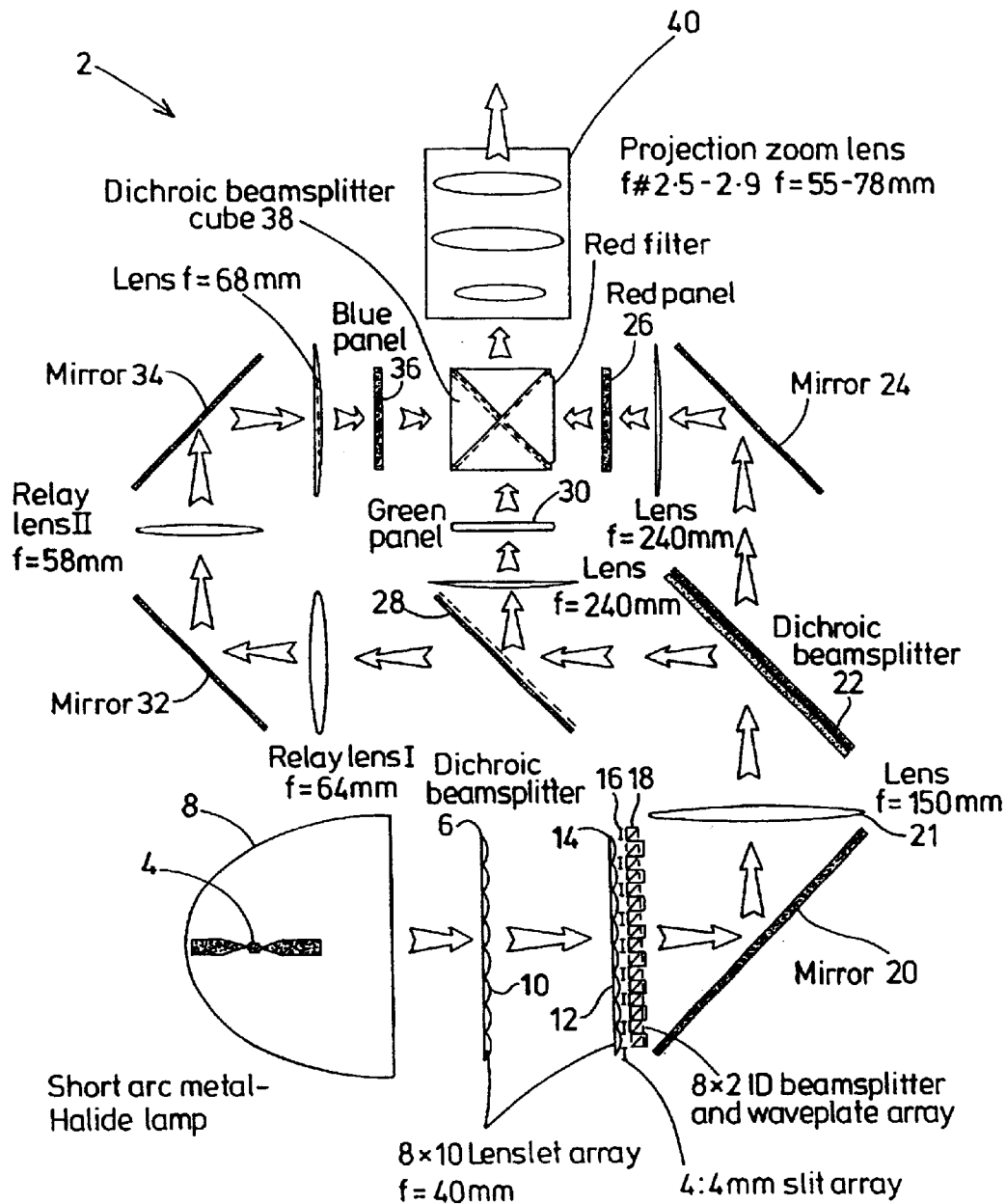
FIG. 1 shows a known LC projector.

FIG. 1 shows the known liquid crystal (LC) projector 2 described in the SID 97 Digest reference mentioned above. The system will not be fully described here because a full description can be found in that reference. However, it is noted that the system comprises a short arc Metal-Halide lamp 4 directed onto a first lenslet array 6 by a parabolic reflector 8. Each lenslet 10 of the first lenslet array 6 directs a separate image of the source onto a corresponding lenslet 12 in a second lenslet array 14.

The light then passes through an aperture array 16, and a polarising beam splitter (PBS) array 18 (described in greater detail below) onto a mirror 20, and through an imaging lens 21. Red light is separated by a first dichroic beamsplitter 22 and passes via a mirror 24 onto a LC panel 26 referred to as the red panel. Similarly, green light is reflected by a second dichroic beamsplitter 28 onto a green panel 30, and blue light passes through the dichroic beamsplitter 28 and is reflected by mirrors 32 and 34 onto a blue panel 36. The red, green and blue light, having been modulated by the red, green and blue panels 26, 30 and 36 respectively, is then recombined by a dichroic beamsplitter cube 38 and projected onto a suitable screen (not shown) by a projection zoom lens 40.

The first and second lenslet arrays 6 and 14 act together as an optical integrator, in that each pair of lenslets in the two arrays images the source 4 onto the whole area of the panels 26, 30 and 36. Therefore a reasonably uniform intensity distribution across the panels is achieved even though the intensity distribution from the source 4 varies between different lenslets in the arrays. The optical integration is also referred to as optical homogenisation.

Homogenising schemes based on dual lenslet arrays are described in the prior art patents mentioned above. In these schemes each of the elements of the first array is imaged solely by a single element of the second array. In this way parallel imaging systems are realised which allow images of all the elements of the first array to be superimposed onto a single image plane. By making the shape of the elements of the first array match that of the panel to be illuminated (ie. for rectangular panels, by ensuring that the elements and the panel have the same aspect ratio), it is possible to uniformly illuminate the panel, minimising the light falling outside the active area of the panel. This is the basis of the homogenisation.

Each lenslet 10 within the first lenslet array is identical to each other lenslet 10. The lenslets 12 in the second lenslet array 14 are also identical to each other. Furthermore, the first lenslet array 6 as a whole is identical to the second lenslet array 14 as a whole.

Figure 2:
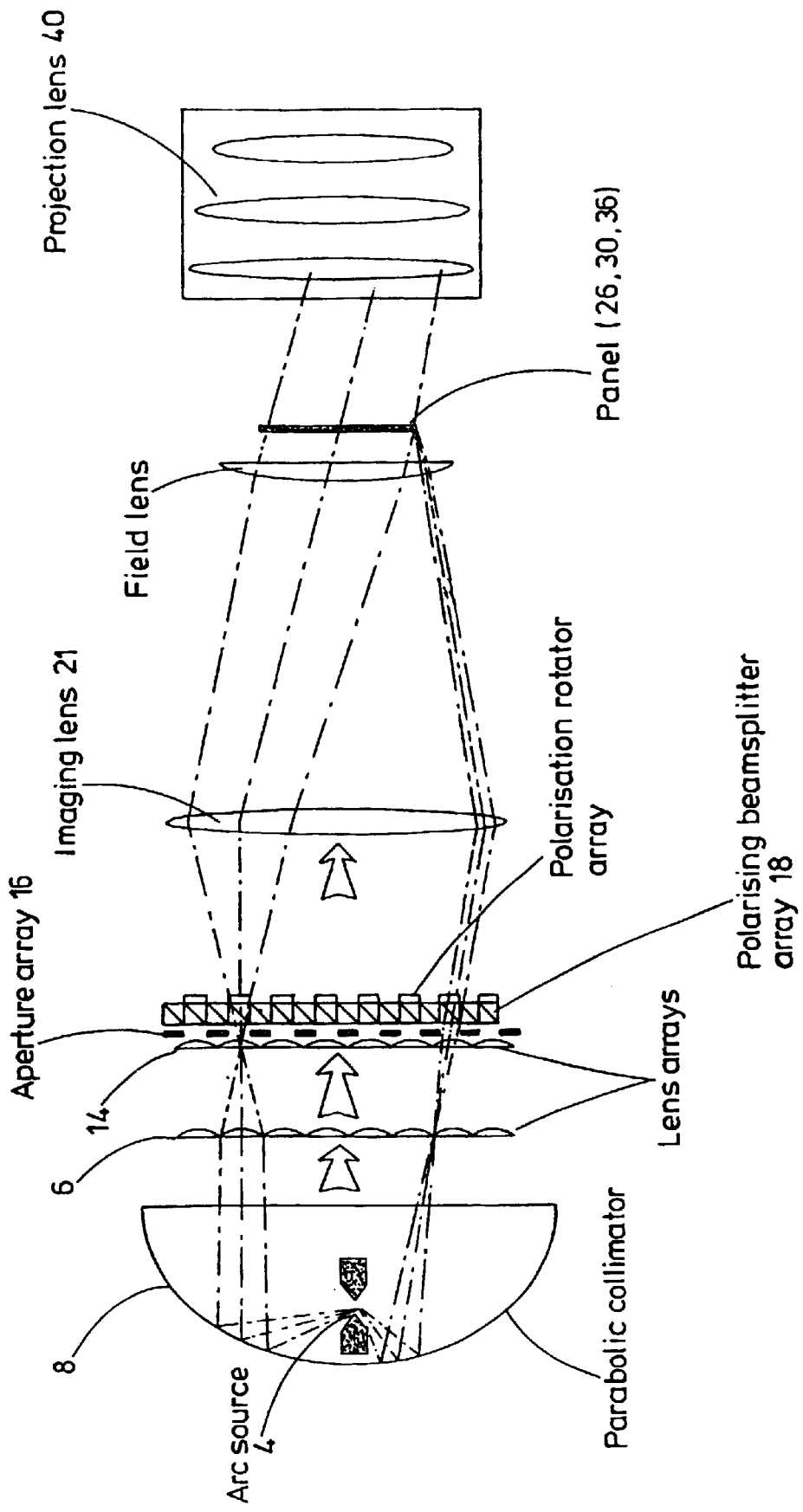
FIG. 2 shows part of the system of FIG. 1, which is shown in unfolded form for greater clarity.

FIG. 2 is an unfolded view of part of the system of FIG. 1, showing the light path for one of the three colours. Like parts are given like reference numerals in the figure, and throughout the figures.

Figure 3:
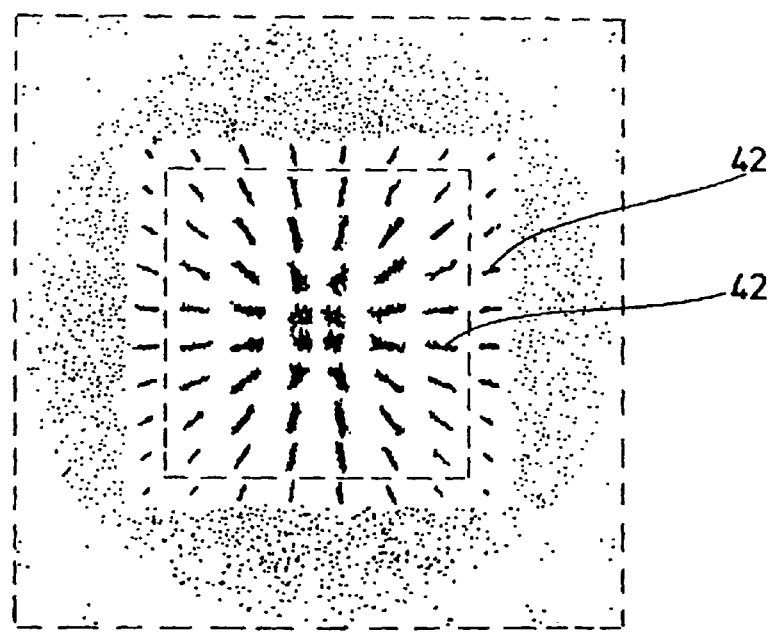
FIG. 3 shows images of the small arc source produced by the first lenslet array of the system of FIG. 1, the image plane being at the input to a polarisation conversion element comprising a polarising beam splitter (PBS) array.

FIG. 3 shows the intensity distribution at the plane of the input to the PBS array 18. Each lenslet 10 in the first lenslet array 6 produces a separate image 42 of the source 4, two of which are indicated in FIG. 3.

Figure 4:
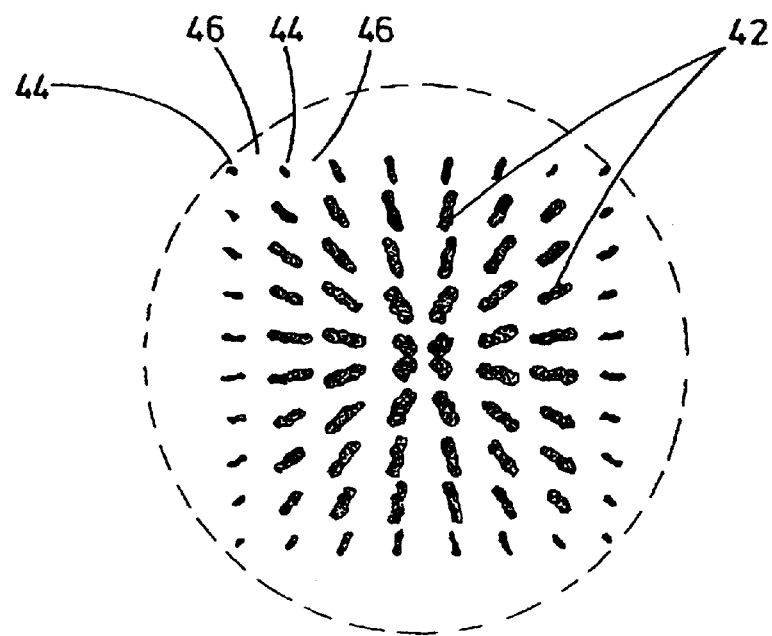
FIG. 4 shows the light intensity distribution at the input of the PBS array which forms part of the system of FIG. 1.

FIG. 4 shows the same intensity distribution, but has been produced by modelling. It will be seen that the intensity distribution forms a number of vertical lines of images, or stripes 44 with vertical gaps 46 therebetween. The aperture array 16 comprises a series of parallel strips, which lie within the vertical gaps 46. The focal length of the lenslets 10 in the first array 6 is chosen such that the image 42 of the source 4 is half the size of the aperture of the lenslets 12 in the second array 14. This is necessary because of the way in which the PBS array works, which will be described below.

Figure 5:
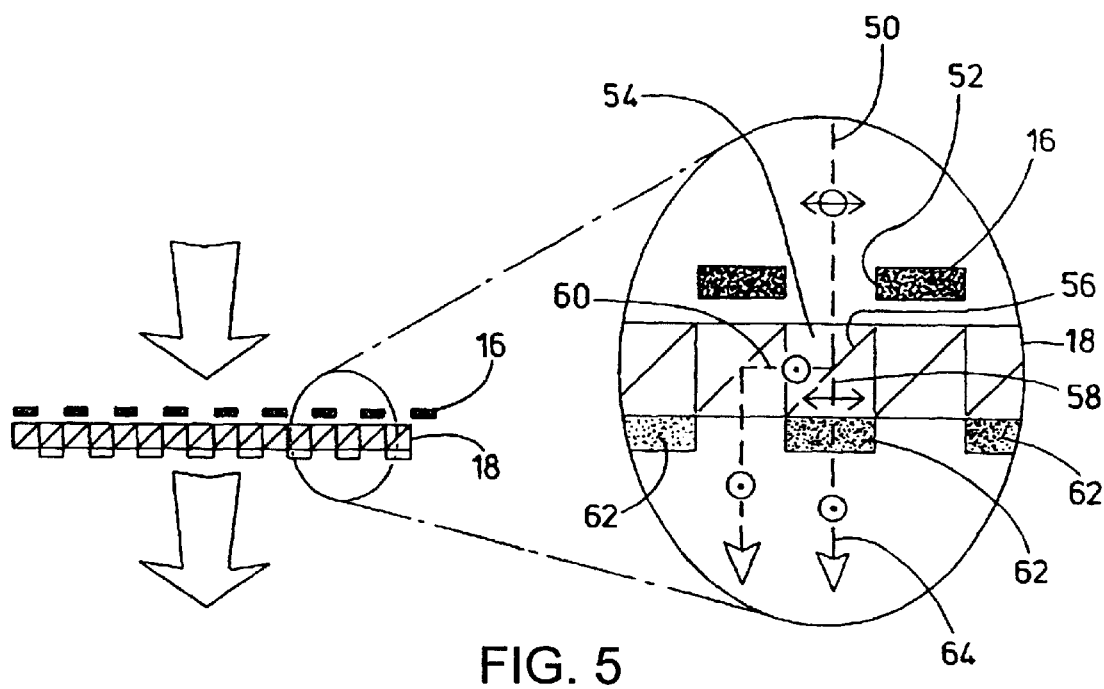
FIG. 5 shows the PBS array forming part of the system of FIG. 1, and a portion of it in greater detail.

FIG. 5 shows the PBS array 18, which is described in detail in the SID 97 Digest reference mentioned above. Unpolarised light 50 passes through apertures 52 in the shutter array 16 and enters a PBS unit 54. The PBS array 18 is formed from an array of such PBS units 54. A first internal surface 56 separates the incoming light 50 into a p-polarised light beam 58 which is transmitted and an s-polarized light beam 60 which is reflected. A subsequent reflection of the vertically polarised (s-polarised) light beam 60 acts to direct it into the gaps 46 in the original striped illumination pattern (see FIG. 6). Stripes of broadband half-wave birefringent material 62 are situated on the output of the PBS array 18 to convert the horizontally polarised (p-polarised) light beam 58 to a vertically polarised output beam 64. In this way, the illumination at the panels 26, 30, 36 is near uniform in intensity and is linearly polarised.

Figure 6:
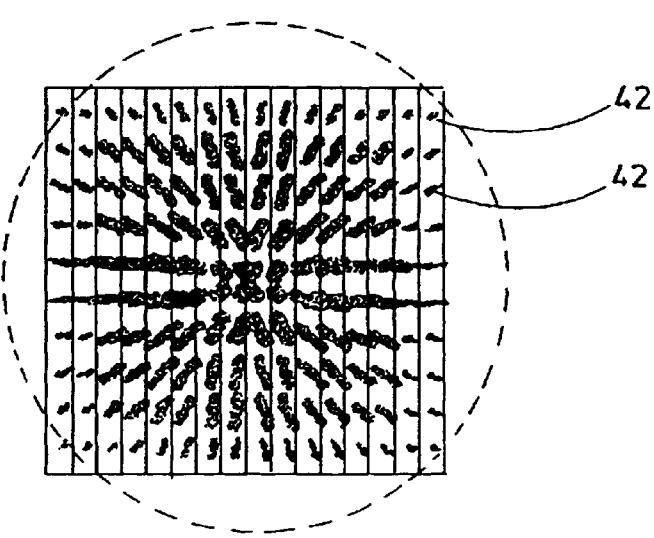
FIG. 6 shows the light intensity distribution at the output of the PBS array of FIG. 5.

For arc lamps collimated by parabolic reflectors the non-uniformity of the source makes the stripes non-uniform in the vertical plane. FIGS. 3, 4 and 6 show the non-uniformity of the flux in the input and output plane of the PBS array 18. This non-uniformity means the area over which the light has to be collected is bigger than the area where there is light. That is, there are holes in the distribution. With the known LC projector shown in FIG. 1, the optical elements later on in the system have to be bigger then necessary, to collect all the light because a large percentage of their input apertures are not used, that is there is no light going through these areas. The result of this is either that the lenses have to be faster than needed leading to higher costs or, as in the case of small projectors, light is lost because the lenses cannot be made at commercial prices that allow collection of all the light.

Figure 8:
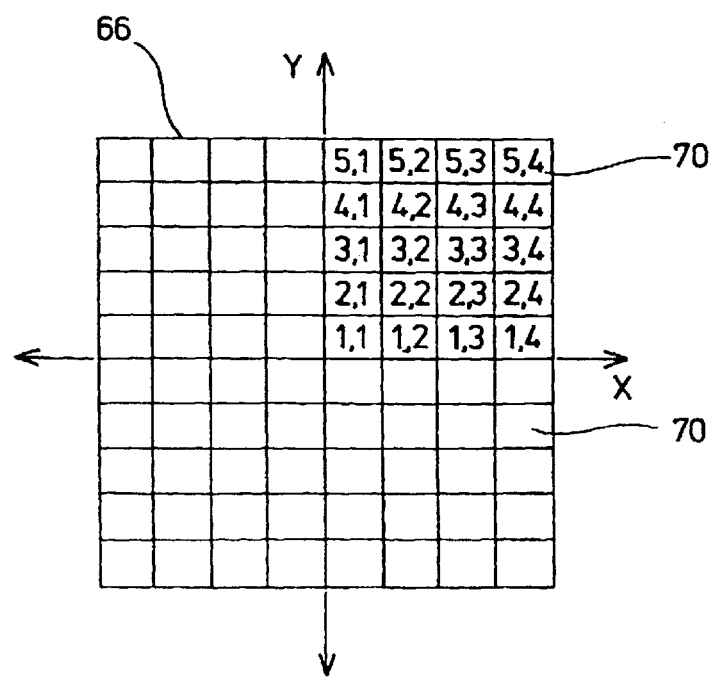
FIG. 8 is a schematic representation of the first lenslet array used to produce the output shown in FIG. 7, the array having reflection symmetry about the x and y axes.
Figure 9:
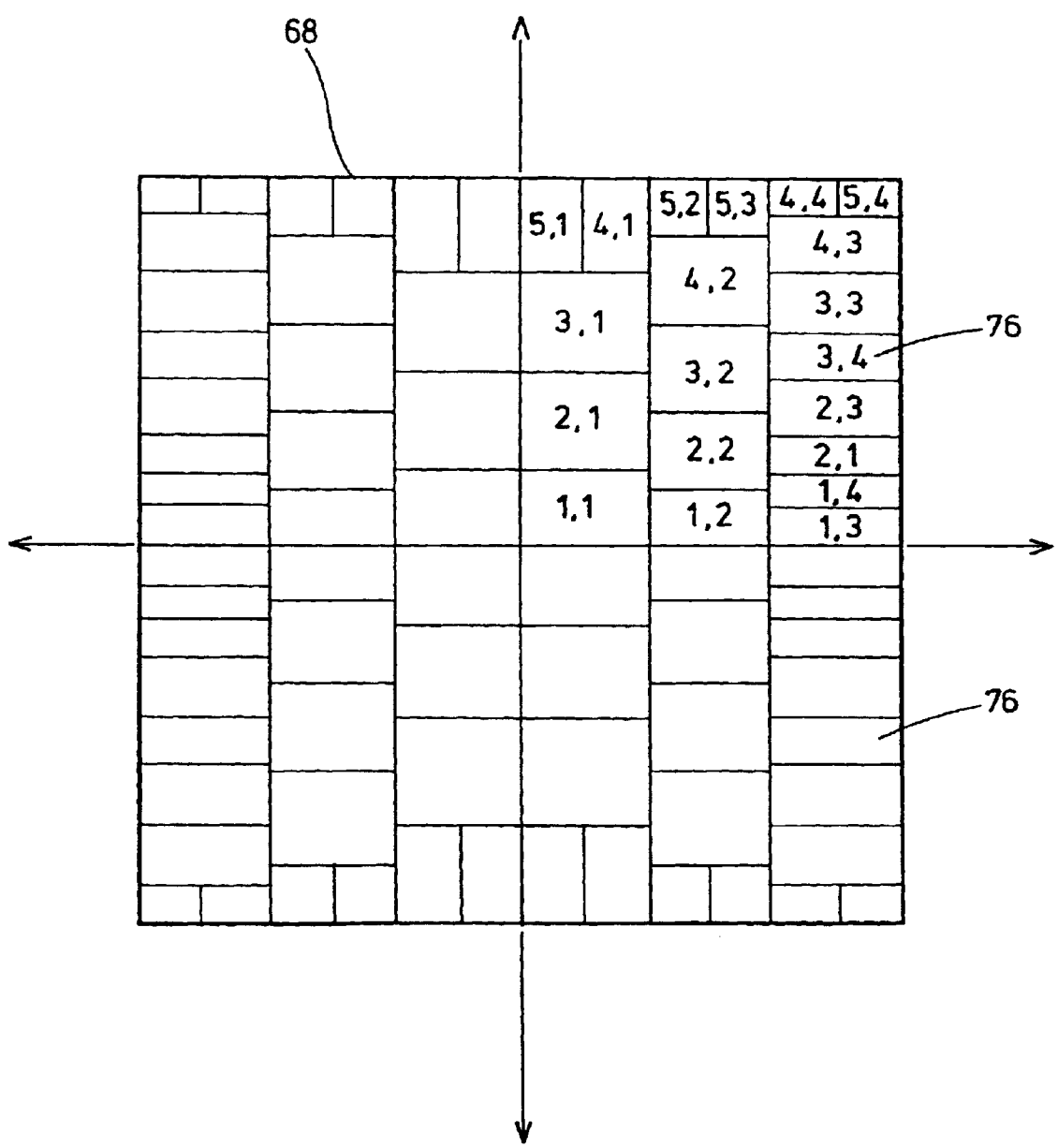
FIG. 9 is a schematic representation of the second lenslet array used with the first lenslet array of FIG. 8, the array again having reflection symmetry about the x and y axes.

In an embodiment of the invention the first and second lenslet arrays 6 and 14 are modified to produce the modified first and second lenslet arrays 66 and 68 shown in FIGS. 8 and 9 respectively.

Figure 7:
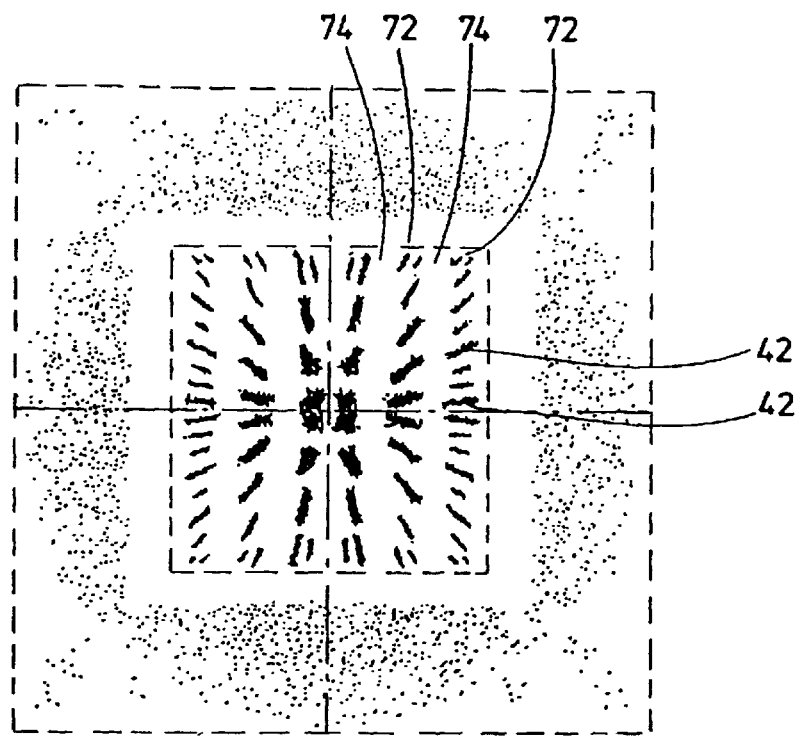
FIG. 7 shows an array of images of the source produced at the output of the first lenslet array modified in accordance with an embodiment of the invention.

The first lenslet array 6 is modified in order to "close pack" the source images in the input plane of the PBS array 18 in order to fill the voids in the intensity distribution, but still allows a second array 68 of rectangular lenses to be used. To do this the first lenslet array 66 has similar physical dimensions to the first lenslet array 6 of the conventional system of FIGS. 1 and 2, but each lenslet 70 has its optical axis moved so that the source image is deflected to form a close-packed striped image in the input plane of the PBS array 18. FIG. 7 shows the effect of moving the optic axes of the lenslets 70 for a modelled arc source. The ray positions are shown in the focal plane of the lenslets 70. The effect of modifying the lenslets 70 of the first lenslet array 66 is to move the source images 42 so that they are "packed" more closely together. However, the source images 42 are moved in such a way as to ensure that they are still arranged in vertical stripes 72 separated by vertical gaps 74, thus ensuring that the light still passes through the elongate apertures 52 in the aperture (or shutter) array 16 (see FIG. 5).

For each source image 42 from the first lenslet array 66 there is a corresponding lenslet 76 within the second lenslet array 68 (see FIG. 9) to allow for separate imaging of the source. This means that the size and position of the lenslets 76 within the second array 68 are dependent on the positions of the optic axes of the lenslets 70 and the properties of the lamp. In order to be compatible with the superimposed imaging the lenslets 70 of the first lenslet array 66, the optic axis of any one lenslet 76 of the second lenslet array 68 must be the projection of the physical centre of the corresponding lenslet 70 in the first lenslet array 66 onto the plane of the second lenslet array 68. The lenslets 76 of the second lenslet array 68 thus act to "re-straighten" the beams which are deflected as a result of modification of the first lenslet array 66. That is the light is first deflected from propagating along the optic axis of the system by the lenslets 70 of the first lenslet array 66, before being deflected back again by the lenslets 76 of the second lenslet array 68.

Each pair of first and second lenslets 70 and 76 thus has the following reciprocal relationship. When looking along the optic axis (ie the central axis) of the system the physical centre of the first lenslet 70 is the optic axis of the second lenslet 76, and the physical centre of the second lenslet 76 is the optic axis of the first lenslet 70. The positioning of these lenslet axes and the sizing of the lenslets are of course source dependent.

Furthermore, although the lenslets 70 of the first lenslet array 66 all have the same aperture shape and size (ie. the same aspect ratio as the panels 26, 30 and 36) they have different optical axes (which are also not parallel to the main optical axis of the system). The lenslets 76 of the second lenslet array 68 differ from each other in both size (and shape) and optical axis.

The following table sets out the prescription numbers for the first lenslet array 66 shown in FIG. 8. These numbers have been chosen for a specific light source that includes a 15 mm arc gap source, and may be understood with reference to FIG. 10.

TABLE 1

Lens array 1 (optical axis equal to centre of element in lens array 2)

| lens | x centre | y centre | x size | y size | x min | x max | y min | y max |
|---|---|---|---|---|---|---|---|---|
| 1.1 | 4.0 | 3.0 | 8.0 | 6.0 | 0.0 | 8.0 | 0.0 | 6.0 |
| 1.2 | 12.0 | 3.0 | 8.0 | 6.0 | 8.0 | 16.0 | 0.0 | 6.0 |
| 1.3 | 20.0 | 3.0 | 8.0 | 6.0 | 16.0 | 24.0 | 0.0 | 6.0 |
| 1.4 | 28.0 | 3.0 | 8.0 | 6.0 | 24.0 | 12.0 | 0.0 | 6.0 |
| 2.1 | 4.0 | 9.0 | 8.0 | 6.0 | 0.0 | 8.0 | 6.0 | 12.0 |
| 2.2 | 12.0 | 9.0 | 8.0 | 6.0 | 8.0 | 16.0 | 6.0 | 12.0 |
| 2.3 | 20.0 | 9.0 | 8.0 | 6.0 | 16.0 | 24.0 | 6.0 | 12.0 |
| 2.4 | 28.0 | 9.0 | 8.0 | 6.0 | 24.0 | 32.0 | 6.0 | 12.0 |
| 3.1 | 4.0 | 15.0 | 8.0 | 6.0 | 0.0 | 8.0 | 12.0 | 18.0 |
| 3.2 | 12.0 | 15.0 | s.0 | 6.0 | 1.0 | 16.0 | 12.0 | 18.0 |
| 3.3 | 20.0 | 15.0 | 8.0 | 6.0 | 16.0 | 24.0 | 12.0 | 18.0 |
| 3.4 | 28.0 | 15.0 | 8.0 | 6.0 | 24.0 | 32.0 | 12.0 | 18.0 |
| 4.1 | 4.0 | 21.0 | 8.0 | 6.0 | 0.0 | 8.0 | 18.0 | 24.0 |
| 4.2 | 12.0 | 21.0 | 8.0 | 1.0 | 1.0 | 16.0 | 18.0 | 24.0 |
| 4.3 | 10.0 | 21.0 | 1.0 | 6.0 | 11.0 | 24.0 | 18.0 | 24.0 |
| 4.4 | 28.0 | 21.0 | 8.0 | 6.0 | 24.0 | 32.0 | 11.0 | 24.0 |
| 5.1 | 4.0 | 27.0 | 8.0 | 6.0 | 0.0 | 8.0 | 24.0 | 30.0 |
| 5.2 | 12.0 | 27.0 | 8.0 | 6.0 | 8.0 | 16.0 | 24.0 | 30.0 |
| 5.3 | 20.0 | 27.0 | 8.0 | 6.0 | 16.0 | 24.0 | 24.0 | 30.0 |
| 5.4 | 28.0 | 27.0 | 8.0 | 6.0 | 24.0 | 32.0 | 24.0 | 30.0 |

The following table sets out the prescription numbers for the second lenslet array 68 shown in FIG. 9.

TABLE 2

Lens array 2 (optical axis equal to centre of element in lens array 1)

| lens | x centre | y centre | x size | y size | x min | x max | y min | Y max |
|---|---|---|---|---|---|---|---|---|
| 1.1 | 4.0 | 2.5 | 8.0 | 5.1 | 0.0 | 8.0 | 0.0 | 5.1 |
| 1.2 | 12.0 | 1.8 | 8.0 | 3.6 | 8.0 | 16.0 | 0.0 | 3.6 |
| 1.3 | 20.0 | 1.3 | 8.0 | 2.6 | 16.0 | 24.0 | 0.0 | 2.6 |
| 1.4 | 20.0 | 3.7 | 8.0 | 2.1 | 16.0 | 24.0 | 2.7 | 4.8 |
| 2.1 | 4.0 | 8.2 | 8.0 | 6.3 | 0.0 | 8.0 | 5.1 | 11.4 |
| 2.2 | 12.0 | 6.3 | 8.0 | 5.3 | 8.0 | 16.0 | 3.7 | 9.0 |
| 2.3 | 20.0 | 9.1 | 8.0 | 3.7 | 16.0 | 24.0 | 7.3 | 11.0 |
| 2.4 | 20.0 | 6.0 | 8.0 | 2.5 | 16.0 | 24.0 | 4.8 | 7.3 |
| 3.1 | 3.9 | 14.7 | 8.0 | 6.5 | 0.0 | 7.9 | 11.5 | 18.0 |
| 3.2 | 12.0 | 11.7 | 8.0 | 5.5 | 8.0 | 16.0 | 9.0 | 14.5 |
| 3.3 | 20.0 | 15.9 | 8.0 | 3.9 | 16.0 | 24.0 | 14.0 | 17.9 |
| 3.4 | 20.0 | 12.5 | 8.0 | 3.0 | 16.0 | 24.0 | 11.0 | 14.0 |
| 4.1 | 5.9 | 20.9 | 4.2 | 6.1 | 3.8 | 8.0 | 17.9 | 24.0 |
| 4.2 | 12.0 | 17.4 | 8.0 | 5.9 | 8.0 | 16.0 | 14.5 | 20.4 |
| 4.3 | 20.0 | 19.8 | 8.0 | 3.8 | 16.0 | 24.0 | 17.9 | 21.7 |
| 4.4 | 18.2 | 22.8 | 4.3 | 1.3 | 16.1 | 10.4 | 21.7 | 24.0 |
| 5.1 | 1.9 | 20.9 | 3.8 | 6.1 | 0.0 | 3.8 | 17.9 | 24.0 |
| 5.2 | 10.0 | 22.1 | 3.9 | 3.7 | 8.1 | 12.0 | 20.3 | 24.0 |
| 5.3 | 14.0 | 22.1 | 4.1 | 3.7 | 12.0 | 16.1 | 20.3 | 24.0 |
| 5.4 | 22.2 | 22.8 | 3.7 | 2.3 | 20.4 | 24.1 | 21.7 | 24.0 |

Figure 10:
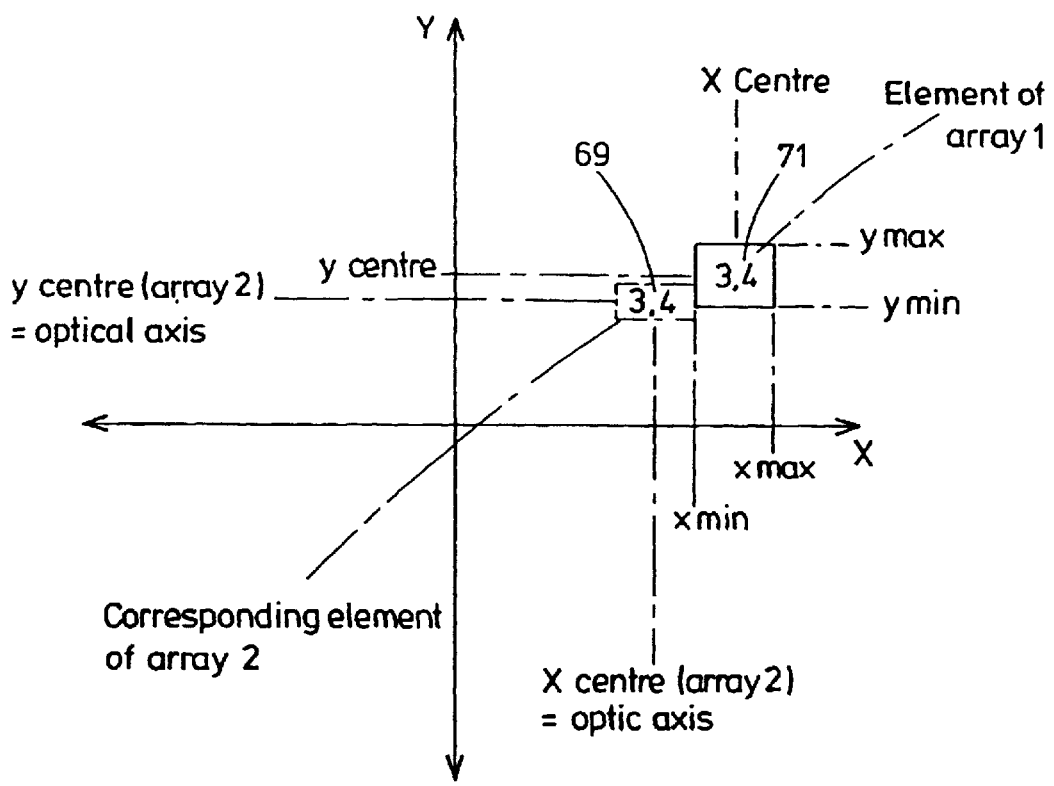
FIG. 10 is a diagram explaining the prescription numbers given in Tables 1 and 2 below.

FIG. 10 explains the prescriptions detailed in tables 1 and 2 for the two lenslet arrays 66 and 68. The tables give the size and position of the lenslet apertures as well as the position of the optic axis. The physical position of the element is defined by xmin, xmax, ymin and ymax while the position of the optical axis is defined by (x centre) and (y centre).

FIG. 10 shows, as an example, the lenslet 70 of the first lenslet array 66 at location (3, 4) (see FIG. 8), and the lenslet 76 of the second lenslet array 68 also at location (3, 4) (see FIG. 9). These two lenslets, both at location (3, 4) are labelled by reference numerals 71 and 69 respectively in FIG. 10.

The effect of using the first and second lenslet arrays 66 and 68 shown in FIGS. 8 and 9 has been modelled using ASAP software, assuming ideal lens operation. The results of this modelling indicate that the use of the modified arrays 66 and 68 results in equivalent flux at the panel (26,30,36) when compared with the conventional system of FIG. 1 but with reduced extent.

Figure 11:
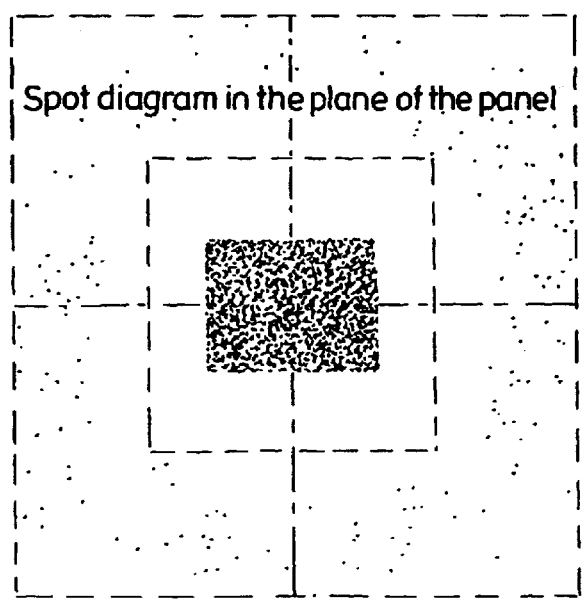
FIG. 11 is a spot diagram showing the output at the panel of the improved system.
Figure 12:
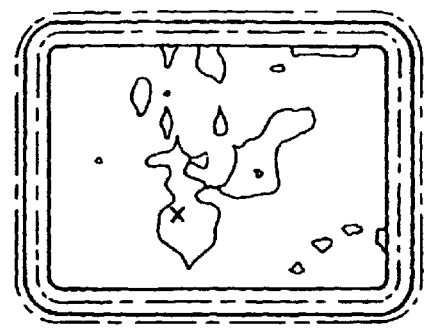
FIG. 12 is a contour map of the flux at the panel.
Figure 13:
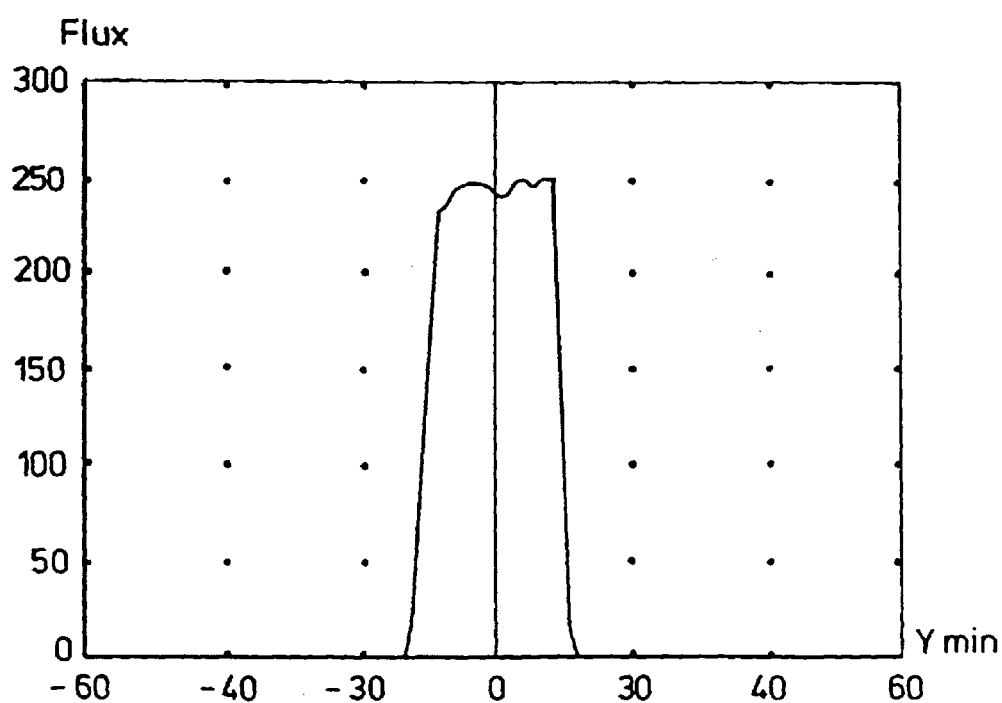
FIG. 13 is a vertical intensity profile of illumination at the panel.

FIGS. 11 to 13 show the output on the panel (26,30,36). The reduction in extent was measured by altering the f-number of the illumination/imaging lens 21 and measuring the flux at the panel (26,30,36) for the conventional and modified systems.

FIG. 12 illustrates a contour plot of the intensity distribution at the panel plane and shows that the secondary source is essentially rectangular in form and relatively uniform. FIG. 13 represents a vertical (y-direction) slice through the intensity distribution of FIG. 12 and shows a very sharp "top-hat" distribution. The intensity distributions and fluxes shown in FIGS. 11 and 14 are all in the plane of the panels 26, 30 and 36.

Figure 14:
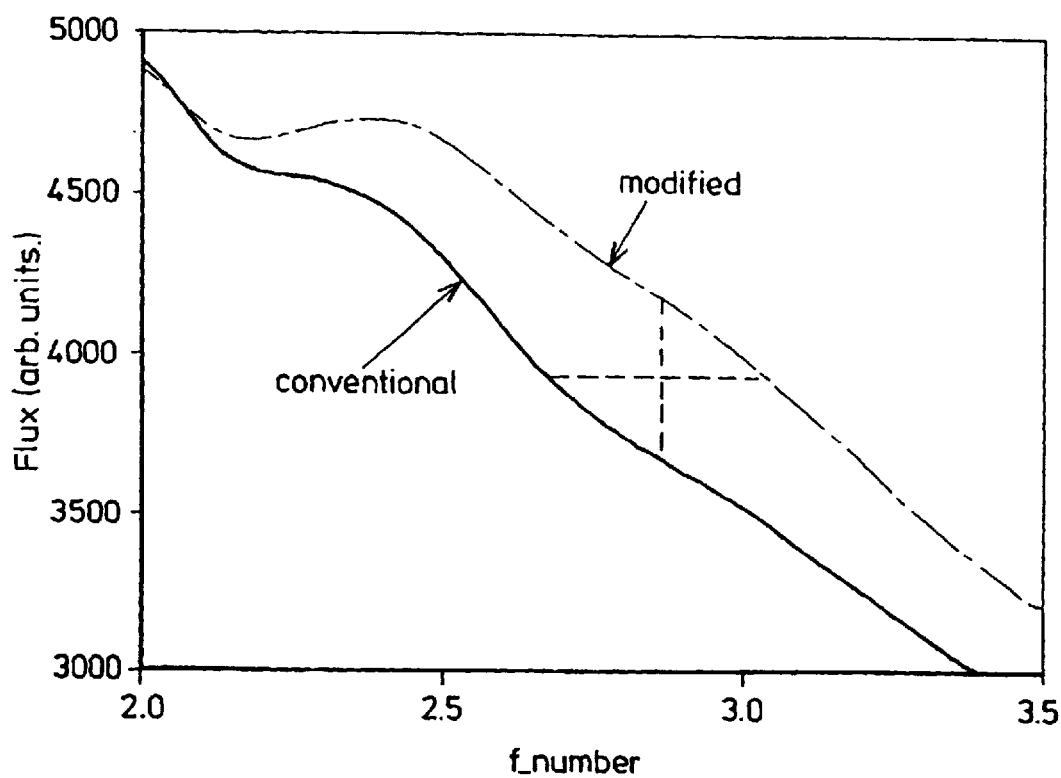
FIG. 14 shows the improvement in optical extent, and has been produced by modelling based on ideal lens elements.

FIG. 14, which shows flux arriving at the panel versus the f-number of the imaging lens 21 for both the conventional and modified systems, shows there to be a significant improvement (10% greater efficiency for a system limited by source size or a change of f-number from 2.6 to 3.1 with similar throughput) when the modified system is modelled. This represents significant cost saving. Alternatively a larger arc source could be used or a smaller panel with equivalent output. All these are attractive options and result from effectively reducing the extent of the source by close-packing of the source images as described above.

In real systems there will be a coupling loss due to the off-axis operation of the lenslets but this can be minimised by restricting the degree to which the lenslets are off-axis.

Figure 15:
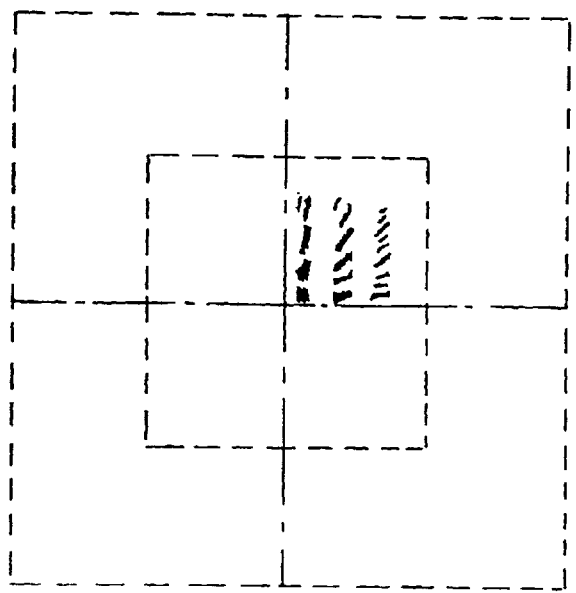
FIG. 15 shows the output at the input plane of a PBS array for a further embodiment of the invention which does not incorporate rectangular lenses.

The improvement already shown can be increased in further embodiments that do not incorporate rectangular lens apertures at the second lens array. The output of such a further embodiment at the input plane of the PBS array 18 is shown in FIG. 15. Once again for any given lamp, a specific optimum packing of the source images would be chosen.

In further embodiments the extent can be limited to the point where light is lost due to overfilling of the elements in the second lens array.

The overall shapes of the first and second lenslet arrays 66 and 68 shown in FIGS. 8 and 9 need not be the same. For example, the first lenslet array 66 may be square, and the second lenslet array 68 rectangular. The use of a second lenslet array having a rectangular external outline is advantageous for example if a set of reflecting dichroic elements, separating the light into red, green and blue beams separated in angle, is placed before the projection lens because the separate colour images of the source can be stacked together to efficiently fill the projection lens input pupil.

What is claimed is:

1. A liquid crystal projector comprising a light source, a first lenslet array comprising a plurality of first lenslets, a second lenslet array comprising a plurality of second lenslets and being con-focal with said first lenslet array, and at least one liquid crystal panel, wherein at least some of said first lenslets are non-identical with each other, and at least some of said second lenslets are non-identical with each other, wherein the projector further comprises a polarising array comprising a plurality of polarising elements each arranged to polarise light passing through a respective second lenslet, each first lenslet is paired with a corresponding second lenslet to form a pair of lenslets, the spatial arrangement of first lenslets within said first lenslet array is different from the spatial arrangement of second lenslets within said second array, and for each pair of lenslets the physical centre of the first lenslet is the optic axis of the second lenslet and the physical centre of the second lenslet is the optic axis of the first lenslet.

2. A liquid crystal projector as claimed in claim 1, wherein said first lenslet array produces an array of source images in a plane, and the area over which said array of source images extends is smaller than it would be if the first lenslets were identical with each other.

3. A liquid crystal projector as claimed in claim 1, characterised in that said first lenslets are arranged in a number of lines, and said first lenslet array produces a plurality of images of said source arranged in stripes, and wherein at least some of said stripes contain source images from more than one of said lines so that the number of said stripes is less than the number of said lines.

4. A liquid crystal projector as claim in claim 2, wherein said first lenslets are arranged in a number of lines, and said first lenslet array produces a plurality of images of said source arranged in stripes, and wherein at least some of said stripes contain source images from more than one of said lines so that the number of said stripes is less than the number of said lines.

5. A liquid crystal projector as claimed in claim 2, wherein each first lenslet is paired with a corresponding second lenslet to form a pair of lenslets, and wherein the spatial arrangement of first lenslets within said first lenslet array is different from the spatial arrangement of second lenslets with said second array.

6. A liquid crystal projector as claimed in claim 1, wherein each first lenslet is rectangular in shape.

7. A liquid crystal projector as claimed in claim 1, wherein in that each second lenslet is slightly larger than an image of said source produced at the second lenslet by a corresponding first lenslet.

8. A liquid crystal projector as claimed in claim 1, wherein some light is lost as a result of overfilling of at least some of said second lenslets.

9. A liquid crystal projector as claimed in claim 1, wherein said plurality of polarising elements is an array of polarising beam splitter elements located behind said second lenslet array.

10. A liquid crystal projector as claimed in claim 9, wherein an aperture array is located in front of said array of polarising beam splitter elements.

11. A liquid crystal projector as claimed in claim 10, wherein said aperture array comprises a plurality of elongate apertures arranged parallel to each other.

12. A liquid crystal projector as claimed in claim 1, which further comprises three separate liquid crystal panels for modulating red, green and blue light respectively.

13. A liquid crystal projector as claimed in claim 1, which further comprises a projection lens arranged to project a television image onto a wall or screen.

14. A liquid crystal projector as claimed in claim 1, wherein the overall shape of the first lenslet array is different from the overall shape of the second lenslet array.

15. A liquid crystal projector as claimed in claim 14, wherein the first lenslet array is generally square, and the second lenslet array is generally rectangular.

16. A liquid crystal projector as claimed in claim 2, wherein each first lenslet is rectangular in shape.

17. A liquid crystal projector as claimed in claim 2, wherein each second lenslet is slightly larger than an image of said source produced at the second lenslet by a corresponding first lenslet.

18. A liquid crystal projector as claimed in claim 2, wherein some light is lost as a result of overfilling of at least some of said second lenslets.

* * * * *